UNITED STATES PATENT OFFICE.

JOSEPH F. GENT, OF COLUMBUS, INDIANA.

MACARONI.

SPECIFICATION forming part of Letters Patent No. 466,230, dated December 29, 1891.

Application filed March 19, 1889. Serial No. 303,895. (No specimens.)

*To all whom it may concern:*

Be it known that I, JOSEPH F. GENT, a citizen of the United States, residing at Columbus, in the county of Bartholomew and State of Indiana, have invented certain new and useful Improvements in Macaroni; and I do hereby declare the following to be a full, clear, and exact description of the invention, such as will enable others skilled in the art to which it appertains to make and use the same.

My invention relates to the class of commercial articles consisting of dried pastes of cereals of uniform shape, such as are known in the market as "macaroni," "vermicelli," and others; and it consists in a new and distinctive product of the class made from uncooked-corn material. Heretofore it has been impossible to make a sufficiently strong or tenacious paste from corn to utilize the same in the manufacture of these articles; but by my improved process I am enabled to so break up the cellular structure of the constituent parts of the corn-kernels that I form a strongly gelatinous and tough paste, which can be readily made into shape of macaroni. This is accomplished by first crushing or grinding the corn in a dry state, then purifying in the same manner, steaming the purified material to moisten and soften, but not to cook it, and subjecting it to successive and progressive hot rollings or compressions, reducing it to a thin flake condition, then reducing this flaked product to a strong paste by the addition of water, and then forming the same into the shape of macaroni. The maceration of the corn is so complete that although uncooked but a short time is required to prepare the completed article for use as food.

The new product or article is far more easily digested than the macaroni of commerce, and is also more nutritious.

What I claim, and desire to secure by Letters Patent, is—

The herein-described article of manufacture, consisting of macaroni wholly composed of uncooked-corn material.

In testimony whereof I affix my signature in presence of two witnesses.

JOSEPH F. GENT.

Witnesses:
 L. B. WHITAKER,
 J. H. WHITAKER.